(12) United States Patent
Buettner

(10) Patent No.: US 9,482,259 B2
(45) Date of Patent: Nov. 1, 2016

(54) FIXING UNIT, FASTENING DEVICE AND MOTOR VEHICLE

(71) Applicant: GM GLOBAL TECHNOLOGY OPERATIONS LLC, Detroit, MI (US)

(72) Inventor: Jonas Buettner, Mainz (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 22 days.

(21) Appl. No.: 14/525,034

(22) Filed: Oct. 27, 2014

(65) Prior Publication Data

US 2015/0117978 A1 Apr. 30, 2015

(30) Foreign Application Priority Data

Oct. 26, 2013 (DE) .................... 20 2013 009 546 U

(51) Int. Cl.
*F16B 39/00* (2006.01)
*F16B 33/00* (2006.01)
*B23K 35/02* (2006.01)
*F16B 5/08* (2006.01)
*F16B 37/06* (2006.01)

(52) U.S. Cl.
CPC ........... *F16B 33/00* (2013.01); *B23K 35/0288* (2013.01); *F16B 5/08* (2013.01); *F16B 37/061* (2013.01)

(58) Field of Classification Search
CPC ........ F16B 5/08; F16B 33/00; F16B 37/041; F16B 37/061; F16B 39/00
USPC .................................................. 411/103, 107
See application file for complete search history.

(56) References Cited

U.S. PATENT DOCUMENTS

| | | | | |
|---|---|---|---|---|
| 3,116,776 A * | 1/1964 | Flora | ...................... | F16B 37/041 411/112 |
| 3,358,729 A * | 12/1967 | Munse | .................. | F16B 37/041 411/175 |
| 4,270,591 A * | 6/1981 | Gill | ........................ | F16B 37/041 403/299 |
| 5,700,103 A * | 12/1997 | Tsai | ...................... | F16B 37/005 348/E5.129 |
| 6,010,274 A * | 1/2000 | Abouzahr | ................. | F16B 5/02 403/260 |
| 6,079,920 A * | 6/2000 | Dispenza | .............. | F16B 37/061 411/107 |
| 6,106,207 A * | 8/2000 | Kuzdak, III | .......... | F16B 41/002 411/107 |
| 6,685,255 B2 * | 2/2004 | Kasahara | ............. | B62D 29/048 296/180.1 |
| 6,705,635 B2 * | 3/2004 | Hoeft | ...................... | B60R 21/20 280/728.2 |
| 6,722,832 B2 * | 4/2004 | Hartmann | ............. | F16B 41/002 411/107 |
| 6,981,737 B2 * | 1/2006 | Welsh | ................ | B60H 1/00571 296/187.02 |
| 7,527,464 B2 * | 5/2009 | Stewart | .................... | F16B 21/09 411/107 |
| 7,726,924 B2 * | 6/2010 | Lu | ......................... | F16B 37/061 411/171 |
| 7,784,857 B2 * | 8/2010 | Naik | ..................... | F16B 5/0241 296/193.1 |
| 8,684,648 B2 * | 4/2014 | Olson | ................... | F16B 33/002 411/368 |
| 8,793,855 B2 | 8/2014 | Hain et al. | | |
| 8,920,089 B1 * | 12/2014 | Stewart | ................ | F16B 5/0258 411/112 |
| 8,998,549 B2 * | 4/2015 | Pimper | ................. | F16B 35/047 411/107 |
| 2009/0283640 A1 * | 11/2009 | Ebner | .................. | F16B 33/006 244/131 |

FOREIGN PATENT DOCUMENTS

| | | |
|---|---|---|
| DE | 4436082 C1 | 10/1995 |
| DE | 19747417 A1 | 4/1999 |
| DE | 102008022371 A1 | 11/2009 |
| DE | 102010019545 A1 | 12/2010 |
| DE | 102012107944 A1 | 3/2014 |

OTHER PUBLICATIONS

Search Report dated Apr. 23, 2014 for Application DE 20 2013 009 546.6.

* cited by examiner

*Primary Examiner* — Roberta Delisle
(74) *Attorney, Agent, or Firm* — Lorenz & Kopf LLP

(57) ABSTRACT

A fixing unit for a fastening device to fix a first vehicle component to a second vehicle component is disclosed. The fastening device includes a plate element fixed to a coupling section on an essentially flat surface of the first vehicle component. A threaded stud extends from the plate element and is configured to be arranged in a receptacle of a second vehicle component.

13 Claims, 3 Drawing Sheets

FIXING UNIT, FASTENING DEVICE AND MOTOR VEHICLE

CROSS REFERENCE TO RELATED APPLICATION

This application claims priority to German Patent Application No. 202013009546.6 filed Oct. 26, 2013, which is incorporated herein by reference in its entirety.

TECHNICAL FIELD

The technical field relates to a fixing unit for a fastening device to fix a first vehicle component to a second vehicle component, a fastening device with such a fixing unit, as well as a motor vehicle with such a fastening device and/or with such a fixing device.

BACKGROUND

Known for joining together two vehicle components is to weld a fixing unit designed as a bolt to a first vehicle component, arrange the second vehicle component on the bolt, and fix both vehicle components against each other with a rear engagement means, for example designed as a nut, via arrangement on the bolt. A fixing unit of this type is known from DE 10 2008 022 371 A1.

It has been found for known fixing units that their surfaces can only be accessed with difficulty given especially compact designs or a compact arrangement of vehicle components inside the motor vehicle, making it impossible or very difficult to weld on the fixing means.

SUMMARY

One aspect of the present disclosure provides a fixing unit that facilitates assembly to a first vehicle component, in particular when space is at a premium.

A fixing unit for a fastening device is provide for fixing a first vehicle component to a second vehicle component. The fixing unit includes at least one pedestal means such as a plate element that can be or is detachably or undetachably fixed with at least one coupling section on an essentially flat surface of the first vehicle component, in particular via spot welding. The fixing unit also includes at least one bolt-like, fixing means such as a threaded stud element that can be or is fixed to the pedestal means. As presently preferred, at least sections of the stud element can be or are arranged in a receptacle of the second vehicle component.

Because the bolt-like fixing means can be or is fixed in or on a pedestal means, the fixing means need not be welded to the first vehicle component. The fact that the pedestal means can be fixed on the essentially flat surface of the first vehicle component in particular via spot welding provides for better accessibility, and also improves an arrangement of the fixing unit on the first vehicle component.

It proves advantageous for the fixing means to encompass a receiving area, in particular a male thread region, on which a rear engagement means of the fastening device can be or is arranged, in particular with the first vehicle component and second vehicle component fixed in place, and/or for the side of the fixing means facing away from the receiving area to encompass an attachment area, with which the fixing means can be or is detachably or undetachably fixed to the pedestal means, in particular adhesively bonded, soldered and/or welded.

It is basically conceivable for the fixing means to be fixed directly to the surface of the pedestal means, for example soldered, welded or adhesively bonded. However, it proves advantageous for the fixing means to include a transverse segment that encompasses the attachment area, and a longitudinal segment that encompasses the receiving area, in particular the male thread region, which together yield a T-shaped cross section. The attachment area is formed on a surface of the transverse segment facing or facing away from the attachment area. In such a case, the contact surface of the fixing means on the pedestal means is elevated, allowing the fixing unit to absorb higher forces.

It is essentially conceivable to weld, adhesively bond or solder the fixing means to a surface of the pedestal means. In addition, an embodiment provides that the pedestal means encompass a depression, which exhibits at least one opening, and in which the fixing means can be or is arranged at least with the transverse segment. This makes it easy to join together the fixing means and pedestal means, and simplifies the positioning of the fixing means on the pedestal means.

In a further development of the embodiment last mentioned, it proves advantageous for the pedestal means to encompass a depression, which exhibits at least one opening, and in which the fixing means can be or is arranged at least with the transverse segment. As a result, the fixing means, in particular the transverse segment, is accommodated in the pedestal means like a casing. The depression in the pedestal means can basically exhibit any depth desired in relation to the coupling sections of the pedestal means. For example, the depth can be less than or equal to the extension of the transverse segment in the longitudinal direction of the longitudinal segment. In addition, the depth can be less than the longitudinal extension of the transverse segment in the longitudinal direction of the fixing means, as a result of which the pedestal means presses the fixing means against the surface of the first vehicle component.

The coupling section of the pedestal means can be designed as desired. It proves advantageous for the coupling section of the pedestal means to encompass at least one, and preferably, several lip-shaped projections. In such a case, the pedestal means and fixing unit can be designed to have less material, since material need only be provided for the projections that include the coupling section.

In further developments of the embodiment last mentioned, it proves advantageous for the coupling section of the pedestal means, in particular the at least one lip-shaped projection, to encompass at least one continuous recess. This makes it easier to arrange the pedestal means on the first vehicle component.

The pedestal means and fixing means can basically consist of any materials desired, and have a varying contour. For example, the fixing means can encompass a polygonal cross section, in particular a two-cornered, triangular, quadrangular, hexagonal, or octagonal cross section. In such a case, the opening in the pedestal means through which the longitudinal segment of the fixing means extends is designed complementarily correspondingly, in particular complementarily, thereto.

However, the pedestal means and fixing means can be easily and cost-effectively designed if the pedestal means encompasses a flexible stamped part and/or if the fixing means encompasses a bolt.

The present disclosure additionally provides a fastening device for fixing a first vehicle component to a second vehicle component, with at least one rear engagement means and with at least one fixing unit, in particular with at least one of the aforementioned features, which encompasses at least one pedestal means that can be or is detachably or undetachably fixed with at least one coupling section on an essentially flat surface of the first vehicle component, and which encompasses at least one, in particular bolt-like, fixing means that can be or is fixed to the pedestal means, at least sections of which can be or are arranged in a receptacle of the second vehicle component.

The present disclosure finally provides a motor vehicle with at least one fastening device, in particular with at least one of the aforementioned features, and/or with at least one fixing unit, in particular with at least one of the aforementioned features.

The fixing unit, fastening device and motor vehicle here prove to be advantageous from a variety of standpoints. Because the bolt-like fixing means can be fixed to a pedestal on a pedestal means, the bolt-like fixing means can be fixed to the first vehicle component via the pedestal means. As a result, the fixing means need not be welded to the first vehicle component, and the pedestal means can be spot welded to the first vehicle component. This makes it possible to fix the fixing unit in place even at locations that are difficult to access.

BRIEF DESCRIPTION OF THE DRAWINGS

The present disclosure will hereinafter be described in conjunction with the following drawing figures, wherein like numerals denote like elements.

DETAILED DESCRIPTION

Figure 1:
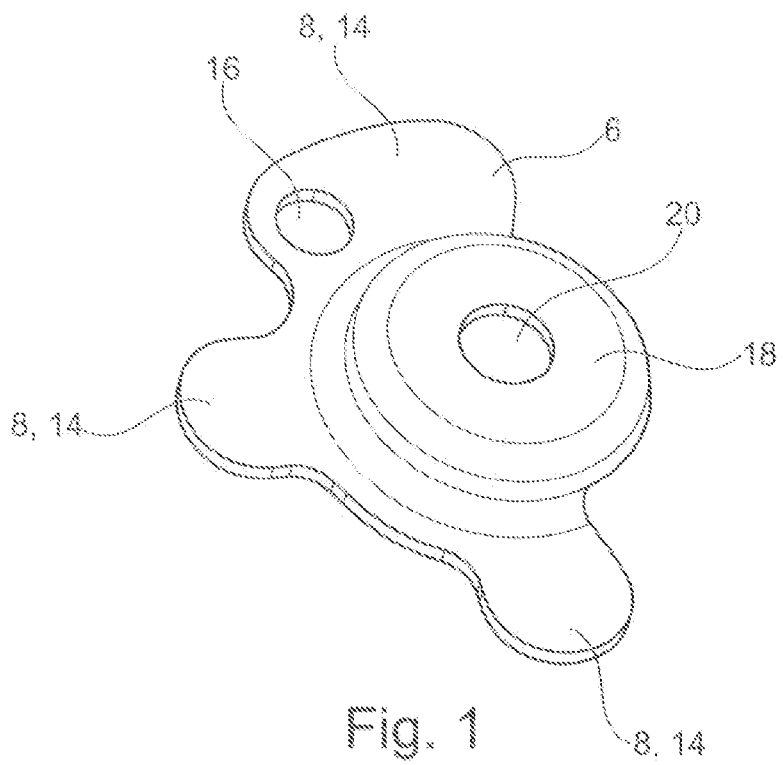
FIG. 1 is a perspective view of a pedestal means of a fixing unit.

The following detailed description is merely exemplary in nature and is not intended to limit the present disclosure or the application and uses of the present disclosure. Furthermore, there is no intention to be bound by any theory presented in the preceding background or the following detailed description.

The figures show a fixing unit marked as a whole with reference number 2 for a fastening device to fix a first vehicle component 4 to a second vehicle component or its individual components. As evident from FIGS. 3 and 4, the fixing unit 2 encompasses at least one pedestal means such as plate element 6, which is undetachably fixed with three coupling sections 8 on an essentially flat surface 10 of the first vehicle components 4. The pedestal means 6 has fixed to it a bolt-like fixing means such as stud element 12. At least sections of the stud element can be arranged in a receptacle of the second vehicle component.

FIG. 1 shows a perspective detailed view of the pedestal means or stud element 6 of the fixing unit 2. The pedestal means 6 is fixed to the essentially flat surface 10 of the first vehicle component 4 by means of arcuate or lip-shaped projections 14 that each encompasses one of the coupling sections 8. One of the lip-shaped projections 14 here encompasses a continuous recess or opening 16. The latter makes it easier to fix the pedestal means 6 to the essentially flat surface 10 of the first vehicle component 4.

To make it easier to receive the fixing means 12, the pedestal means 6 exhibits a recess 18, which encompasses an opening 20. The fixing means 12 can be situated by means of the opening 20 in such a way that it creates a rear engagement with the pedestal means 6.

Figure 2:
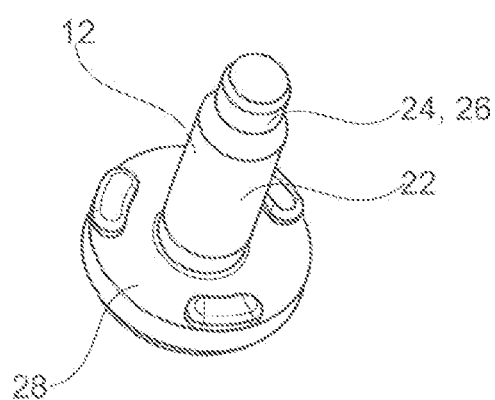
FIG. 2 is a perspective view of a fixing means of a fixing unit.

FIG. 2 shows a perspective detailed view of the fixing means 12. The latter exhibits a longitudinal segment 22 that encompasses a receiving area 24. In the exemplary embodiment depicted on FIGS. 1 to 5, the receiving area 24 encompasses a male thread region 26, to which can be fixed a rear engagement means, such as a nut (not shown). A transverse segment 28 is realized on the fixing means 12 transverse to the longitudinal segment 22. With the fixing means 12 and pedestal means 6 joined together, it forms the rear engagement in the depression 18 with the pedestal means 6.

Figure 3:
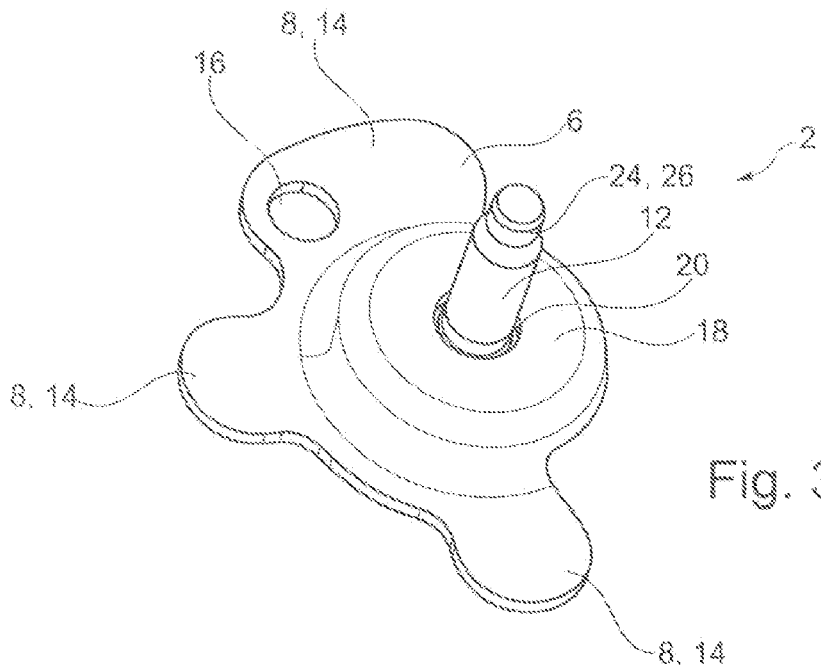
FIG. 3 is a perspective view of a fixing unit, which includes the pedestal means according to FIG. 1 and the fixing means according to FIG. 2.
Figure 4:
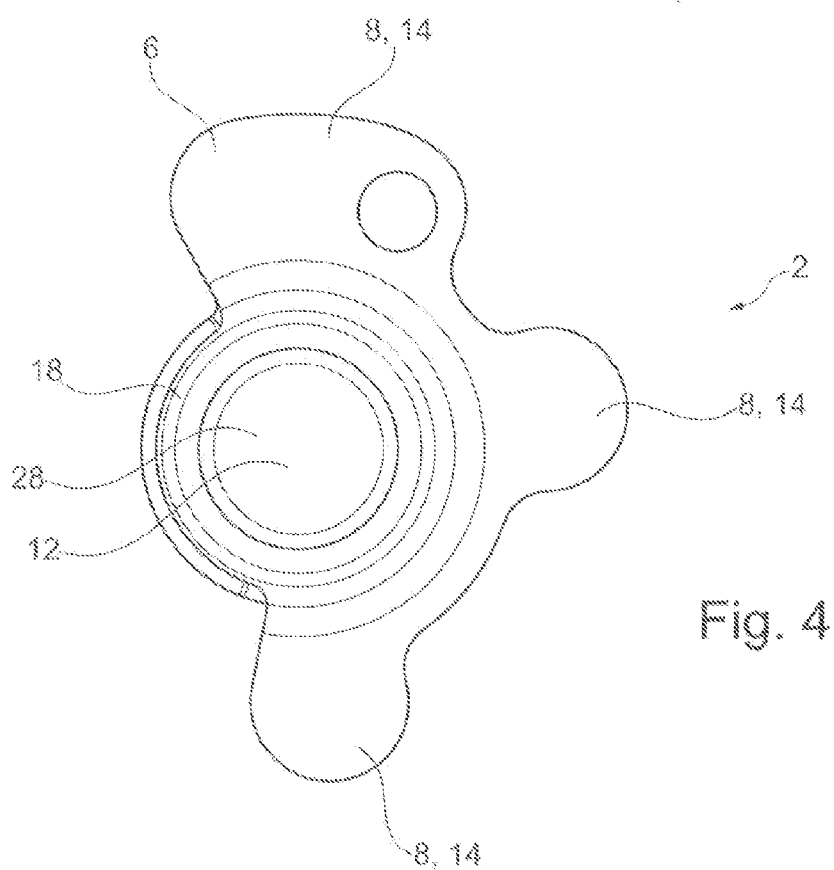
FIG. 4 is a bottom view of the fixing unit according to FIG. 3.
Figure 5:
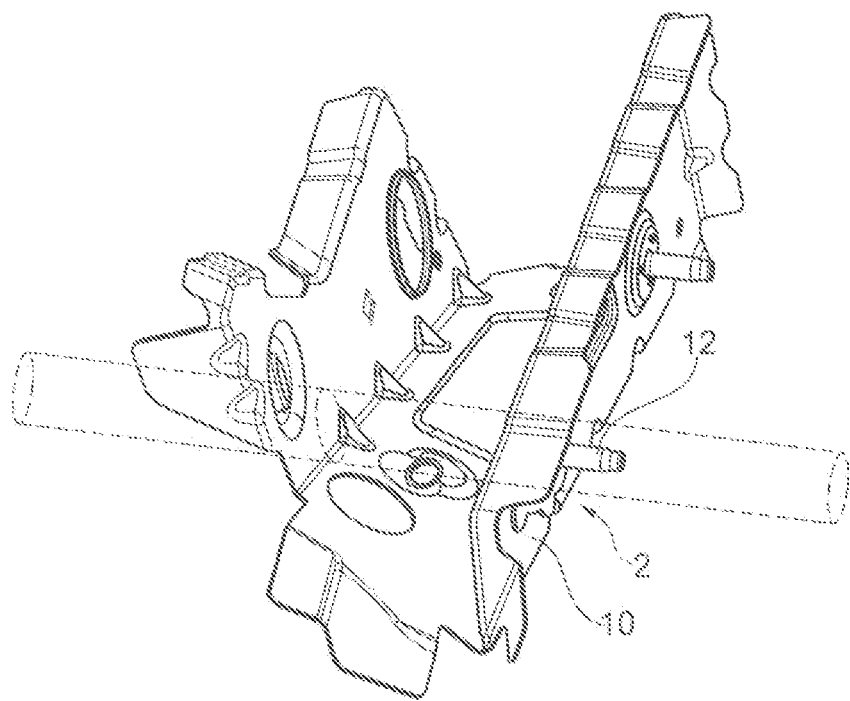
FIG. 5 is a perspective view of the fixing unit on FIGS. 3 and 4 fixed in a first vehicle component.

FIGS. 3 and 4 show the joined arrangement of the pedestal means 6 with the fixing means 12. FIG. 5 shows the arrangement of the fixing unit 2 on the first vehicle component 4.

As will be appreciated, the features of the present disclosure depicted in the preceding specification, in the claims, and in the drawings can be significant in realizing the present disclosure and its various embodiments, both taken individually and in any combination desired. While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A fixing unit for a fastening device to fix a first vehicle component to a second vehicle component comprising at least one plate element secured by at least one coupling section on a flat surface of the first vehicle component, and at least one stud element extending from the plate element, wherein a receiving region of the stud element is configured to be received in a receptacle of a second vehicle component, wherein the plate element further comprises a depression in which a portion of the stud element is arranged, the depth of the depression selected such that the at least one plate element presses the fixing unit against the flat surface of the first vehicle component.

2. The fixing unit according to claim 1 wherein the at least one plate element is configured to be detachably fixed to the flat surface.

3. The fixing unit according to claim 1 wherein the at list one plate element is configured to be undetachably fixed to the flat surface.

4. The fixing unit according to claim 1, wherein the stud element comprises a male threaded region configured to receive a nut of the fastening device for fixing the first vehicle component and second vehicle component in place.

5. The fixing unit according to claim 1 wherein the stud element comprises a side having an attachment area affixing the stud element to the plate element.

6. The fixing unit according to claim 5, wherein the stud element comprises a transverse segment, and a longitudinal segment having a male threaded region, wherein the transverse segment and the longitudinal segment together define a T-shaped stud element.

7. The fixing unit according to claim 6, wherein the attachment area is formed on a surface of the transverse segment.

8. The fixing unit according to claim 6, wherein the plate element comprises an opening bordered by an edge, wherein the opening receives the longitudinal segment of the stud element, and wherein the edge is abutted by the fastening area of the transverse segment to define a rear engagement.

9. The fixing unit according to claim 6, further comprising a coupling section having at least one lip-shaped projection formed on the plate element.

10. The fixing unit according to claim 9, wherein the coupling section further comprises at least one opening formed therethrough.

11. The fixing unit according to claim 1, further comprising a stamped part configured as the plate element and a bolt configured as the threaded stud.

12. A fastening device for fixing a first vehicle component against a second vehicle component comprising a rear engagement unit having a plate element and a threaded stud extending therefrom, wherein the plate element includes at least one coupling section fixed on a flat surface of a first vehicle component, and wherein a male threaded portion of the threaded stud is received in a receptacle of a second vehicle component, and wherein the plate element further comprises a depression in which a portion of the threaded stud is arranged, the depth of the depression selected such that the at least one plate element presses the stud element against the flat surface of the first vehicle component.

13. A motor vehicle comprising a first vehicle component, a second vehicle component and at least one fastening device according to claim 12.

* * * * *